United States Patent [19]

Anscher

[11] Patent Number: 5,361,461
[45] Date of Patent: Nov. 8, 1994

[54] PRELOADABLE CORD LOCK

[75] Inventor: Joseph Anscher, Port Washington, N.Y.

[73] Assignee: National Molding Corp., Farmingdale, N.Y.

[21] Appl. No.: 122,111

[22] Filed: Sep. 16, 1993

[51] Int. Cl.5 .............................................. F16G 11/00
[52] U.S. Cl. .................................. 24/115 G; 24/136 R
[58] Field of Search ............. 24/115 G, 135 L, 136 L, 24/136 R, 455, 543

[56] References Cited

U.S. PATENT DOCUMENTS

| | | | |
|---|---|---|---|
| 4,453,292 | 6/1984 | Bakker | 24/115 G |
| 4,622,723 | 11/1986 | Krauss | 24/115 G |
| 4,724,584 | 2/1988 | Kasai | 24/115 G |
| 4,794,673 | 1/1989 | Yamaguchi | 24/543 |
| 4,945,849 | 8/1990 | Morris et al. | 24/115 G |
| 5,197,166 | 3/1993 | Meier et al. | 24/115 G |

Primary Examiner—Victor N. Sakran
Attorney, Agent, or Firm—Kenyon & Kenyon

[57] ABSTRACT

A preloadable cord lock for gripping a cord, such as an elastic shock cord, includes a pair of telescoping members having apertures defined therethrough. The telescoping members are biased so that their respective apertures are not aligned. The lock can be preloaded to a condition where the apertures are aligned for feeding a cord through the apertures. The preloading mechanism may then be disengaged which will cause the telescoping members to be urged to a position where their apertures are not aligned by the bias of the device, thereby pinching and locking the cord in place.

18 Claims, 4 Drawing Sheets

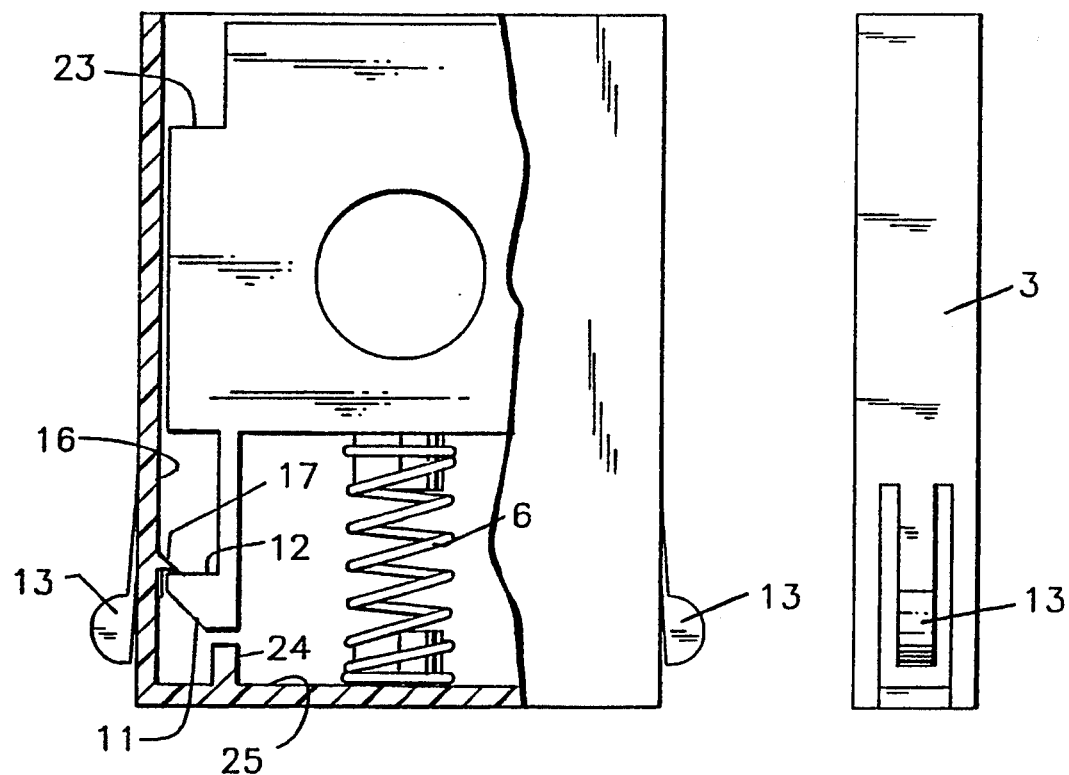
FIG. 3
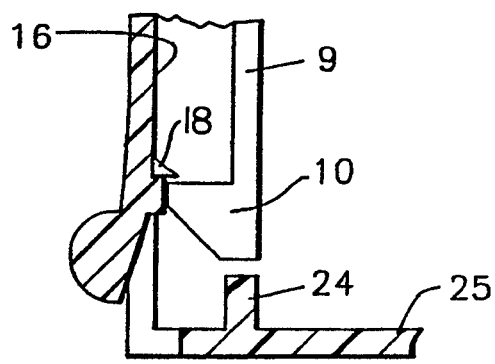
FIG. 5
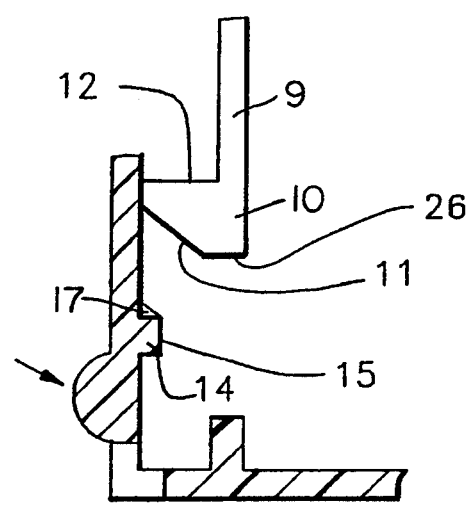
FIG. 4
FIG. 6

PRELOADABLE CORD LOCK

BACKGROUND OF THE INVENTION

1. Field of the Invention

The invention relates generally to cord locks and holders, for example, for use with luggage, baggage, baggage carriers, etc. More particularly, the invention relates to a new cord lock which can be preloaded for ready use and which can subsequently be actuated in an easy manner.

2. Description of Related Art

Cord locks are known in the art for gripping and retaining cord, for example, an elastic shock cord, under tension. Such devices typically include a pair of telescoping members which have apertures therethrough. One telescoping member is biased with respect to the other, so that their respective apertures are not aligned. In order to use the cord lock, it is necessary to load it by squeezing the two telescoping members together so that their respective apertures are aligned. The user must continue to apply pressure to hold the two members together in this aligned state while simultaneously threading the cord through the apertures. Once the cord is threaded, the user may release the pressure which is exerted on the two members. Because the two members are biased so that their apertures are misaligned, they will pinch the cord which has been threaded therethrough so as to retain the cord in a fixed position.

Although this design has proven to be effective in holding and locking a cord, such as an elastic shock cord, one principal disadvantage is that the user must continue to exert pressure to align the apertures of the two telescoping members while simultaneously threading the cord through the apertures. Because the biasing force which is necessary to sufficiently grip the cord is relatively strong, a relatively large amount of finger pressure must be applied to align the apertures. Thus, it can be cumbersome to simultaneously thread the cord through the apertures while maintaining the apertures aligned (i.e., loading the device).

Another shortcoming of the prior art is that there is a risk that the lock can be inadvertently disengaged by someone squeezing the two telescoping members together, thereby relieving the tension on the cord and allowing the cord to slip. To minimize the risk of accidental disengagement, the prior art employs a very strong biasing means which requires a great amount of force to oppose. However, as discussed above, this makes the lock all the more difficult to load prior to threading of the cord.

SUMMARY OF THE INVENTION

Accordingly, it is an object of the invention to provide a cord lock which can be preloaded with its apertures aligned prior to use so that the user can easily thread a cord therethrough without the necessity of simultaneously applying pressure to the lock.

It is a further object of the invention to provide such a lock whereby the preload can be easily released once the cord has been threaded therethrough.

It is another object of the invention to provide a cord lock which cannot be accidentally disengaged during use.

These and other objects of the invention are attained by the preloadable cord holder/lock of the present invention which includes a pair of telescoping members, each having an aperture defined therein, where the telescoping members can be preloaded to a position where the apertures are in an aligned, or at least partially aligned, state, and retained in this preloaded position without the need to apply pressure to the device. A spring or other biasing means is provided for urging the apertures out of alignment, however, it is ineffective to cause such misalignment when the device is in the preloaded state.

The preloaded condition is retained by a mechanism which includes a pair of engagement members provided on the inner telescoping member which cooperate with a corresponding set of engagement members provided on the inner surface of the outer telescoping member. The respective engagement members have cooperating inclined, preferably parallel, surfaces which permit one-way sliding travel of the inner telescoping member with respect to the outer telescoping member, namely, travel in the direction which brings the apertures of the telescoping members into alignment. The respective engagement members further include cooperating surfaces which preclude movement of the telescoping members relative to each other once the apertures are in an aligned condition. In the preloaded state, the cord is fed through the aligned, or semi-aligned, apertures.

The outer telescoping member includes a pair of tabs on opposite sides. Depression of the tabs inward forces the engagement members of the inner telescoping member inward and out of engagement with the engagement members of the outer telescoping member. This allows the inner and outer telescoping members to slide apart under the action of the biasing means. Of course, this movement is restricted by the cord which has been threaded through the aligned apertures. The force which is exerted by the biasing means against the cord will now cause the telescoping members to pinch and retain the cord in a fixed position under the force of friction.

Preferably, the inner and outer telescoping members are configured so that once the cord is threaded through the device and the retaining means is disengaged so as to lock the cord in place, the inner telescoping member will not project out of the outer telescoping member. This will prevent the user from accidentally preloading the device and unlocking the cord.

BRIEF DESCRIPTION OF THE DRAWINGS

FIG. 3 is a partial cross-sectional view of a cord lock in a preloaded condition.

FIG. 4 is a side-view of the cord lock illustrated in FIG. 3.

FIG. 5 is an isolated view of the engagement members of the cord lock of the invention in the preloaded condition.

FIG. 6 is an isolated view of the engagement members of the cord lock in an unloaded condition.

DETAILED DESCRIPTION OF THE INVENTION

Figure 1:
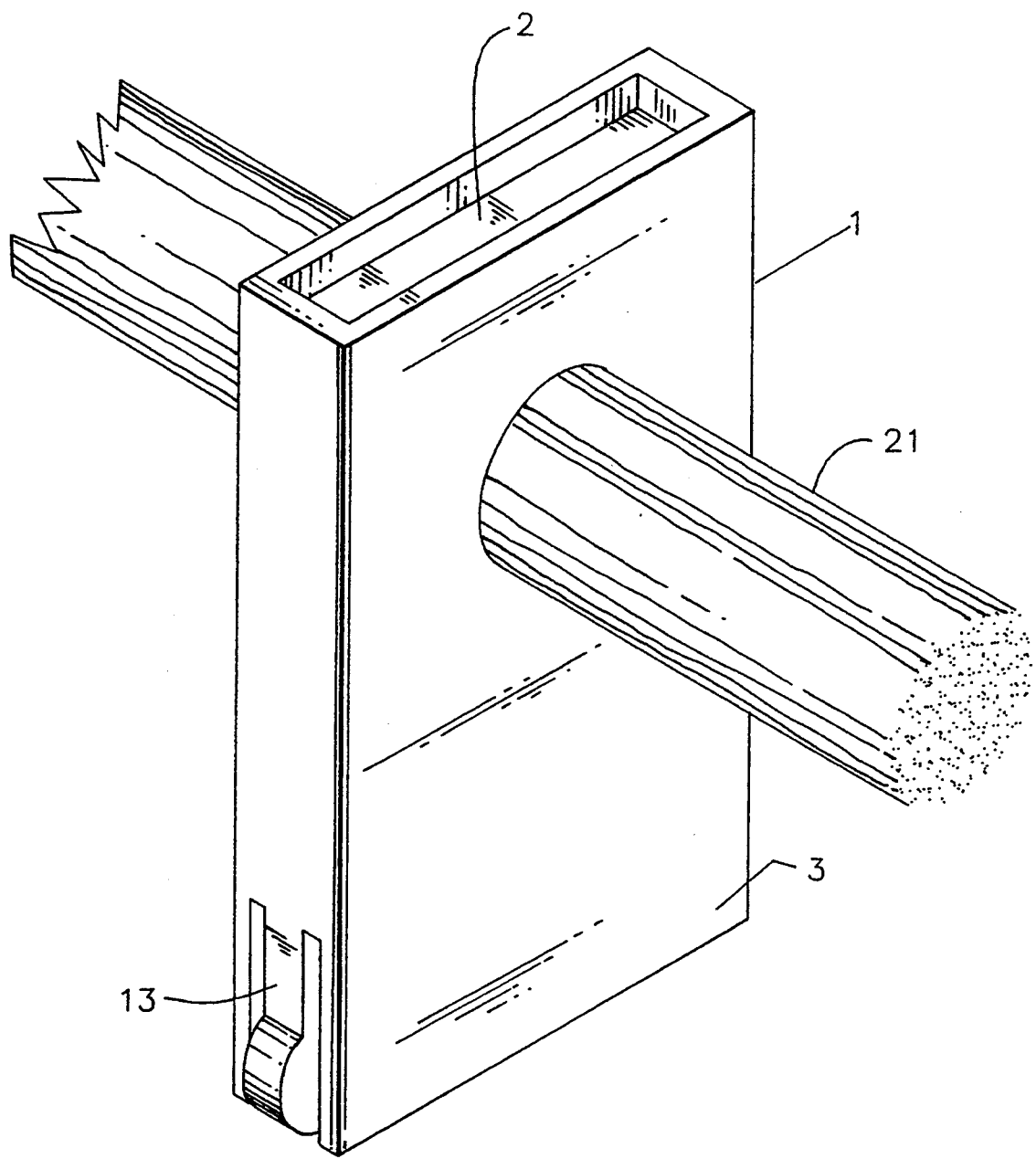
FIG. 1 is an enlarged perspective view of the cord lock of the invention, having a shock cord threaded therethrough, in a locked state.
Figure 2:
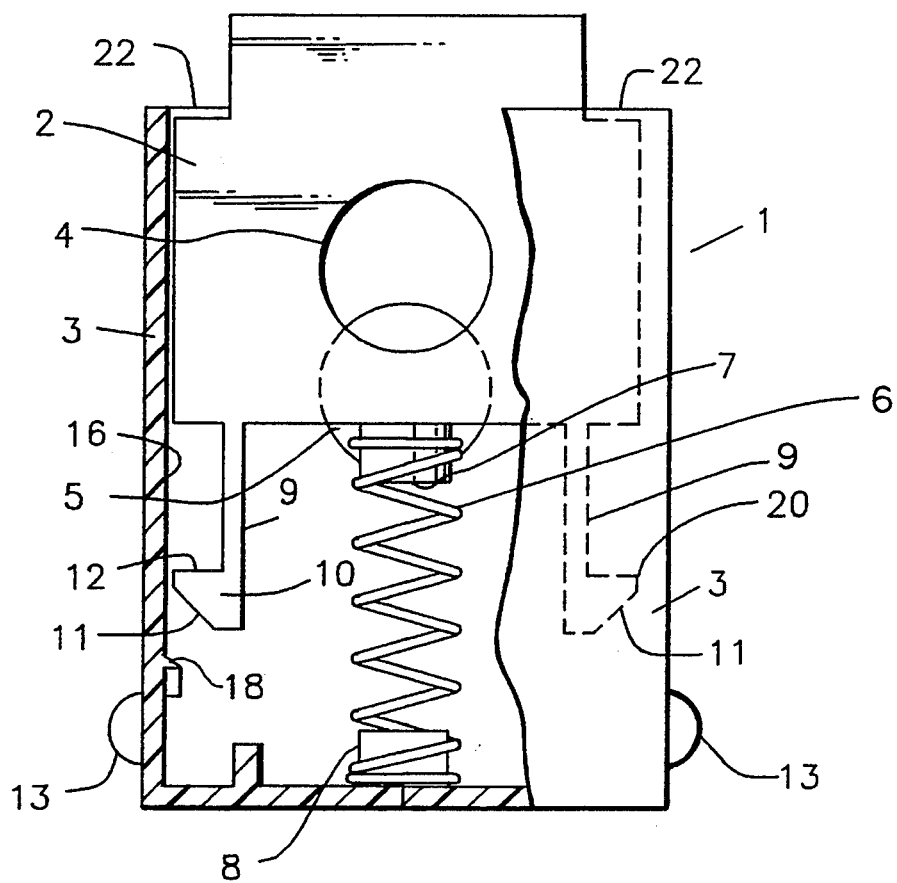
FIG. 2 is a partial cross-sectional view of the cord lock in an unloaded condition.

Referring to FIGS. 1 and 2, the cord lock generally illustrated at 1 includes an inner telescoping member 2 which is slidably received in an outer telescoping member 3. The telescoping members 2, 3 define an aperture 4, 5, respectively, therein. The inner and outer telescoping members are coupled by a biasing means such as a spring 6. The biasing means 6 biases the inner telescoping member 2 in a direction such that the respective apertures 4, 5 of the telescoping members are out of alignment or misaligned as illustrated in FIG. 2. The condition referred to in FIG. 2 shall be referred to as an unloaded condition. Any overlap in apertures 4 and 5 in this unloaded condition (preferably, the apertures are completely out of alignment so that no overlap is present) should be considerably smaller than the diameter of the cord 21 (see FIGS. 1 and 2) which is to be pinched between the apertures using the lock.

As illustrated in FIG. 2, the biasing means may be a spring 6, which receives cylindrical fixing cylinders 7, 8, belonging to the inner and outer telescoping members, respectively, in opposite ends of the spring. The fixing members 7, 8 function to couple the telescoping members to the spring and to restrict unwanted bending or kinking of the spring during compression when the cord lock is preloaded.

The cord lock 1 of the invention includes a retaining means for holding the lock in a preloaded condition where the apertures 4, 5 are in substantial alignment to an extent which is sufficient to define an overlap area which is large enough to receive cord 21 therethrough. In the preferred embodiment, the retaining means includes a pair of arms 9, belonging to the inner telescoping member and projecting downward. Each arm 9 includes an outwardly projecting wing 10. Each wing 10 includes at least a first, inclined surface 11, and a second surface 12 which is normal to the arm 9 to which it belongs. A third surface 20, normal to the second surface 12 and obtusely angled to the first surface 11 may connect the first and second surfaces. The arms 9 are elongated to permit some flexing in lateral directions toward the center of the outer telescoping member 3.

The outer telescoping member 3 is formed with a pair of opposing tabs 13. The tabs are cut from the wall of the outer telescoping member so as to be flexible and movable relative to the outer telescoping member (see FIG. 4). Each tab may have a projection 14, projecting toward the interior of the outer telescoping member. The projection 14 includes a first flat surface 15, whose function will be described hereinafter (see FIG. 6).

Figure 7:
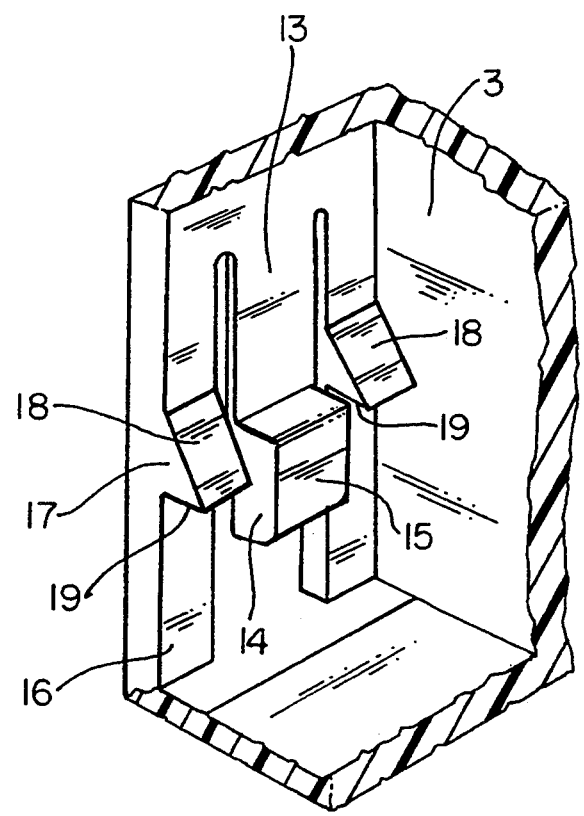
FIG. 7 is an isolated view of a tab and an engagement member on an inner surface of the outer telescoping member.

The inside wall 16 of the outer telescoping member has two sets of opposed engagement projections 17 on opposite sides of the lock, whose cross-section is that of a right triangle, as illustrated in FIGS. 3, 5 and 6. As illustrated in FIG. 7, each set of the opposed engagement projections may consist of a pair of individual projections 17 disposed on opposite sides of the cut-out tabs 13. Each projection 17 includes a first, inclined surface 18 which forms an acute angle with a second surface 19, the second surface 19 being substantially normal to the inner surface 16 of the outer telescoping member. Preferably, the first, inclined surface 18 of each engagement projection 17 is approximately parallel to the first, inclined surface 11 of each corresponding wing 10; and the second surface 19 of each projection 17 is approximately parallel to the second surface 12 of each wing 10, as illustrated in FIG. 2.

As illustrated in FIG. 2, when the device 1 is in an unloaded condition, the apertures 4, 5 of the inner and outer telescoping members will be substantially or completely out of alignment. The spring 6 will urge the telescoping members into this condition. In order to preload the device, the inner and outer telescoping members 2, 3 are forced together to compress the spring 6. This drives the arms 9 and wings 10 of the inner telescoping member 2 downward toward the opposed engagement projections 17 of the outer telescoping member 3. The first, inclined surface 11 of each wing 10 will engage the first, inclined surface 18 of each projection 17. The surfaces are inclined so that the wings may easily slide past the engagement projections 17. It will be appreciated that the arms 9 are flexible enough to be urged laterally toward the center of the device as the wings 10 traverse each projection 17. Once the third surface 20 of each wing has passed by the first, inclined surface 18 of each projection 17, the arms 9 of the inner telescoping member 2 will be free to flex laterally outward in the direction toward the inner wall 16 of the outer telescoping member 3, thereby snapping the wings 10 underneath the second surface 19 of the projections 17 (see FIGS. 3 and 5). Although the compressed spring 6 continues to bias the inner telescoping member 2 away from the outer telescoping member 3, the second surface 19 of projections 17 will engage the second surface 12 of the wings 10 to prevent the wings from moving back over the projection 17. This condition shall be referred to as the preloaded condition. It should be appreciated that the length of the arms 9 and the position of the projections 17 relative to that of the wings 10 is such that the apertures 4, 5 will be aligned in this preloaded condition to an extent which is sufficient to define an area of aperture overlap which is large enough to accommodate a cord to be locked by the device.

It is in this preloaded condition that the user may easily thread a cord 21, such as an elastic shock cord, through the apertures. Once the cord 21 is in the desired position, it can be locked in place by pushing inward on the tabs 13 (i.e., squeezing the tabs between two fingers toward the center of the device). The inward lateral movement of the projection 14 of each tab 13 will engage flat surface 15 with third surface 20 and force each wing 10 inward until each wing has cleared the second surface 19 of projection 17. The spring 6 will then force the telescoping members 2, 3 apart, thereby clamping the shock cord in the apertures which are continually biased out of alignment. This state will be referred to as the locked condition or cord locking position.

In this locked condition, preferably the top of the inner telescoping member 2 does not project out of the top of the outer telescoping member 3. In this way, a person cannot accidentally unlock the device by pushing downward on the inner telescoping member 2 to cause preloading. Preferably, the top of the inner telescoping member 2 is substantially flush with the top of the outer telescoping member 3 or is slightly receded therein in the locked condition as illustrated in FIG. 1. This arrangement prevents accidental unlocking of the device, however, it permits deliberate unlocking of the device as a person would be able to force a fingernail or a pencil or the like, into the outer telescoping member to push the inner telescoping member 2 downward, back to the preloaded position where the cord will be free to slide out of the aligned apertures. The cord lock 1 may then be repositioned to a new desired location and relocked by simply pushing inward on the tabs 13.

The top of the outer telescoping member 3 may have a rim 22 (see FIG. 2) which cooperates with a flange 23 (see FIG. 3) of the inner telescoping member 2 to restrict the movement of the inner telescoping member relative to the outer telescoping member so as to prevent the two members from becoming completely separated. For this purpose, the spring 6 may also be fixedly attached at each of its ends to the fixing members 7, 8. In order to restrict movement of the inner telescoping member relative to the outer telescoping member in the opposite direction, the outer telescoping member may be provided with stop members 24 on the inside surface of its bottom wall 25. The stop members 24 will engage a fourth surface 26 of the wings 10 to prevent further downward movement of the inner telescoping member. Alternatively, tabs 13 and projections 17 may be positioned such that the apertures 4, 5 are aligned when the fourth surface 26 contacts the inner surface of the bottom wall 25 so that no stop members are necessary.

The cord lock of the invention is preferably constructed of a resilient-flexible plastic material to allow for the flexing and snapping cooperation between the arms 9 and the tabs 13. The cord lock is easily molded using conventional molding techniques well known in the art.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than a restrictive sense.

What is claimed is:

1. A preloadable cord lock comprising:
an outer telescoping member having an aperture defined therethrough;
an inner telescoping member having an aperture defined therethrough, the inner member being slidable within the outer member;
a means for retaining the cord lock in a preloaded position where the aperture of the inner member is at least partially aligned with aperture of the outer member such that the cord lock may receive a cord through an area defined by an overlap of both of said apertures in said preloaded position, the means for retaining including cooperating projection means integrally formed to each of the inner and outer telescoping members;
a means for biasing said inner and outer members toward a cord locking position where the aperture of the inner member is out of alignment with the aperture of the outer member to an extent which is sufficient to pinch a cord threaded through the overlap of the apertures; and
a means for disengaging said means for retaining.

2. The cord lock according to claim 1 wherein the means for disengaging includes a tab belonging to the outer telescoping member, the tab being movable against the projection means belonging to the inner telescoping member in the preloaded position for forcing the projection means of the inner telescoping member clear from the projection means belonging to the outer telescoping member, thereby allowing the inner telescoping member to move to the cord locking position under force exerted by the biasing means.

3. The cord lock according to claim 3 wherein the means for disengaging includes a pair of tabs and wherein the projection means belonging to the inner telescoping member includes a pair of arms, each arm having a wing.

4. The cord lock according to claim 4 wherein the projection means belonging to the outer telescoping member includes a pair of opposed projections, each projection being adapted for cooperative engagement with one of said wings.

5. The cord lock according to claim 5 wherein the pair of opposed projections and the pair of wings each include an inclined surface, said inclined surfaces being adapted for permitting sliding movement of the wings past the opposed projections when the telescoping members are moved from the cord locking position to the preloaded position.

6. The cord lock according to claim 6 wherein each of said opposed projections and said wings includes a second surface, said second surfaces of said wings being adapted for engaging said second surfaces of the opposed projections in said preloaded position for preventing sliding movement of the wings over the opposed projections.

7. The cord lock according to claim 7 wherein each wing includes a third surface joining said inclined surface and said second surface, each third surface engaging a tab belonging to the outer telescoping member in said preloaded position.

8. The cord lock according to claim 1 wherein said biasing means is a spring coupled between said inner and outer telescoping members which is compressible to a compressed position in said preloaded position.

9. The cord lock according to claim 1 wherein said inner telescoping member is entirely receded within said outer telescoping member in said preloaded position and in said core locking position.

10. A preloadable cord lock comprising:
an outer telescoping member having an aperture defined therethrough;
an inner telescoping member having an aperture defined therethrough, the inner member being slidable within the outer member;
a means for retaining the cord lock in a preloaded position where the aperture of the inner member is at least partially aligned with aperture of the outer member such that the cord lock may receive a cord through an area defined by an overlap of both of said apertures in said preloaded position;
a means for biasing said inner and outer members toward a cord locking position where the aperture of the inner member is out of alignment with the aperture of the outer member to an extend which is sufficient to pinch a cord threaded through the overlap of the apertures; and
a means integrally formed on said out member for disengaging said means for retaining, wherein said inner telescoping member is entirely receded within said outer telescoping member in said preloaded position and in said cord locking position.

11. The cord lock according to claim 10 wherein the means for retaining includes cooperating projection means belonging to each of the inner and outer telescoping members.

12. The cord lock according to claim 11 wherein the means for disengaging includes a tab belonging to the outer telescoping member, the tab being movable against the projection means belonging to the inner telescoping member in the preloaded position for forcing the projection means of the inner telescoping member clear from the projection means belonging to the outer telescoping member, thereby allowing the inner telescoping member to move to the cord locking position under force exerted by the biasing means.

13. The cord lock according to claim 12 wherein the means for disengaging includes a pair of tabs and wherein the projection means belonging to the inner telescoping member includes a pair of arms, each arm having a wing.

14. The cord lock according to claim 13 wherein the projection means belonging to the outer telescoping member includes a pair of opposed projections, each projection being adapted for cooperative engagement with one of said wings.

15. The cord lock according to claim 14 wherein the pair of opposed projections and the pair of wings each includes an inclined surface, said inclined surfaces being adapted for permitting sliding movement of the wings past the opposed projections when the telescoping members are moved from the cord locking position to the preloaded position.

16. The cord lock according to claim 15 wherein each of said opposed projections and said wings includes a second surface, said second surfaces of said wings being adapted for engaging said second surfaces of the opposed projections in said preloaded position for preventing sliding movement of the wings over the opposed projections.

17. The cord lock according to claim 16 wherein each wing includes a third surface joining said inclined surface and said second surface, each third surface engaging a tab belonging to the outer telescoping member in said preloaded position.

18. The cord lock according to claim 17 wherein said biasing means is a spring coupled between said inner and outer telescoping members which is compressible to a compressed position in said preloaded position.

* * * * *

UNITED STATES PATENT AND TRADEMARK OFFICE
CERTIFICATE OF CORRECTION

PATENT NO. : 5,361,461
DATED : Nov. 8, 1994
INVENTOR(S) : Joseph Anscher

It is certified that error appears in the above-indentified patent and that said Letters Patent is hereby corrected as shown below:

Column 5, line 47, before "aperture" insert --the--;
Column 5, line 53, after "members" insert --and--;
Column 6, line 3, "claim 3" should be --claim 2--;
Column 6, line 8, "claim 4" should be --claim 3--;
Column 6, line 13, "claim 5" should be --claim 4--;
Column 6, line 20, "claim 6" should be --claim 5--;
Column 6, line 27, "claim 7" should be --claim 6--;
Column 6, line 55, "extend" should be --extent--;
Column 6, line 58, "out" should be --outer--;
Column 7, line 21, "includes" should be --include--.

Signed and Sealed this

Fourth Day of April, 1995

Attest:

BRUCE LEHMAN

Attesting Officer

Commissioner of Patents and Trademarks